UNITED STATES PATENT OFFICE.

CHARLES PICARD, OF CHAMPIGNY-SUR-MARNE, FRANCE, ASSIGNOR TO ACÉTYLÈNE DISSOUS & APPLICATIONS DE L'ACÉTYLÈNE, OF PARIS, FRANCE.

STORING ACETYLENE.

1,148,925.   Specification of Letters Patent.   Patented Aug. 3, 1915.

No Drawing.   Application filed November 3, 1910.   Serial No. 590,539.

*To all whom it may concern:*

Be it known that I, CHARLES PICARD, a citizen of the Republic of France, and resident of Champigny-sur-Marne, Seine, France, have invented new and useful Improvements in Storing Acetylene, which improvements are fully set forth in the following specification.

Metal vessels are used for storing explosive gases or explosive mixtures of gas and in particular acetylene these vessels being entirely filled with a porous material, the object of which is to stop the propagation of the explosion in case it should be started at some part of the vessel. This material, which may be composed of various substances, is generally introduced into the vessels in the form of a sort of mortar which solidifies in the vessels either as a result of chemical reactions of the substances or by desiccation or by both means simultaneously or in succession. In any case and by reason of the great porosity it must possess to permit of storing a sufficient volume of gas, this material may have a tendency to cake; this caking or settling which takes place as a result of the weight of the material only or as a result of the shocks to which the vessel is exposed, would serve to create inside this vessel spaces unprovided with porous material and in which an explosion could consequently propagate itself freely. A vessel in which such caking or settling has taken place no longer presents the conditions of safety required for the storage of explosive gases.

With a view to obviating this defect in the porous material the present invention has for its object an improvement in the method of filling vessels intended for the storage of explosive gases.

This improvement consists broadly in establishing inside the bottle or the like, resistances which oppose the displacement of the various strata of porous material and consequently its caking. In order to form these resistances the envelop of the vessel itself may be utilized or devices presenting sufficient strength to support the porous material can be introduced in advance into the interior of the vessel, or finally bodies may be added to the porous material itself which consolidate it and prevent the relative displacement of its several strata.

In detail, the object aimed at can be attained first of all by providing envelops which oppose slipping of the material; for example, envelops corrugated or ribbed transversely like those of certain boiler furnaces or else provided with suitably localized bosses. In this manner the caking of the porous material can be obviated by causing it to adhere perfectly to the walls of the vessel by the intermediary of substances or mixtures of substances with which these walls have previously been coated and which are of such a nature as to insure mechanically or chemically the adherence of the porous material. The porous material being thus fixed to the walls of the vessel throughout the entire length of the latter has no tendency to cake or settle. Any substances which adhere sufficiently well to the wall of metal constituting the wall of the vessel can be employed, such as glues, varnishes and so forth. The substances fulfilling this condition of adherence to the metal wall of the vessel will always adhere well to the porous material provided that the latter be introduced into the vessel at the proper time before the substances employed have lost their adhesive power by drying or otherwise. For example the interior of the vessel can be brushed with a thick solution of silicate of potash or soda the porous material being introduced before the silicate has dried.

The efficacy of the means indicated above can be increased by blowing into the interior of the vessel after it has been coated a filamentous substance, which by adhering to the coating, forms a kind of felting. After drying the porous material is introduced and sets in the felting; this setting produces perfect adherence to the wall of the vessel.

The second embodiment of the invention consists in previously introducing into the vessel a device presenting adequate resistance for supporting the porous material and preventing it from caking or settling; it can be carried into practice in very diverse ways; by way of example rods or fins can be secured to the walls and to the interior of the vessel either by soldering or any other suitable means.

A frame work of parts united in such a manner as to constitute a skeleton, the various elements of which serve to support the porous mass might likewise be inserted previously in the vessel. In particular this framework might be constituted by a metal rod furnished with wings, ribs or spokes and connecting with the walls of the vessel or disconnected from same. Whatever the means employed it should be noted that it is not necessarily completely rigid as the tendency of the material to cake or settle is not great; a relatively weak resistance is sufficient to prevent such caking.

The third embodiment of the invention consists in introducing into the porous material objects which serve to consolidate it is carried into practice by adding to the porous material prior to its introduction or at the actual moment of its introduction into the vessel metallic or other filaments which unravel in forming a felting insuring the solidity of the material which maintains its different strata in place and obviates settling or caking.

Claim:

An improved method of storing, in a vessel, explosives with porous material, which includes first forming a coating inside of the vessel, then blowing into it a filamentous substance to adhere to said coating and engage said porous material for preventing its caking or settling and thus forming free spaces within the vessel and consequent explosion.

In testimony whereof I have signed this specification in the presence of two subscribing witnesses.

CHARLES PICARD.

Witnesses:
 EMILE LEDRET,
 H. C. COXE.